United States Patent
Li et al.

(10) Patent No.: US 11,004,206 B2
(45) Date of Patent: May 11, 2021

(54) THREE-DIMENSIONAL SHAPE EXPRESSION METHOD AND DEVICE THEREOF

(71) Applicant: SHENZHEN INSTITUTES OF ADVANCED TECHNOLOGY CHINESE ACADEMY OF SCIENCES, Shenzhen (CN)

(72) Inventors: Wenchao Li, Shenzhen (CN); Ruizhen Hu, Shenzhen (CN); Hui Huang, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 11 days.

(21) Appl. No.: 16/490,082

(22) PCT Filed: Mar. 21, 2017

(86) PCT No.: PCT/CN2017/077495
§ 371 (c)(1),
(2) Date: Aug. 30, 2019

(87) PCT Pub. No.: WO2018/170731
PCT Pub. Date: Sep. 27, 2018

(65) Prior Publication Data
US 2020/0027215 A1  Jan. 23, 2020

(51) Int. Cl.
*G06T 7/162* (2017.01)
*G06F 17/14* (2006.01)
(Continued)

(52) U.S. Cl.
CPC .............. *G06T 7/162* (2017.01); *G06F 17/14* (2013.01); *G06K 9/6224* (2013.01); *G06T 15/10* (2013.01)

(58) Field of Classification Search
CPC ....... G06F 17/14; G06K 9/6224; G06T 15/10; G06T 2207/10028; G06T 7/11; G06T 7/162
See application file for complete search history.

(56) References Cited

U.S. PATENT DOCUMENTS

2017/0243352 A1\* 8/2017 Kutliroff ............... G06T 19/006

FOREIGN PATENT DOCUMENTS

| CN | 101807308 A | 8/2010 |
| CN | 101944239 A | 1/2011 |

(Continued)

OTHER PUBLICATIONS

Liu, Jialu, "Image Retrieval based on Bag-of-Words model", Apr. 18, 2013, https://arxix.org/abs/1304.5168v1 (Year: 2013).\*

(Continued)

*Primary Examiner* — Michelle L Sams

(57) ABSTRACT

The present disclosure provides a three-dimensional shape expression method and device thereof. The method includes following steps: extracting a hybrid type framework of a three-dimensional shape; obtaining a segmentation of the three-dimensional shape by segmenting the hybrid type framework; obtaining a sub-structure of the three-dimensional shape according to the segmentation of the three-dimensional shape; and establishing an expression of the three-dimensional shape by using a bag-of-words model according to the sub-structure of the three-dimensional shape. The embodiments of the present disclosure are capable to express a three-dimensional shape with an easy and high-efficient method.

10 Claims, 5 Drawing Sheets

(51) Int. Cl.
G06K 9/62 (2006.01)
G06T 15/10 (2011.01)

(56) References Cited

FOREIGN PATENT DOCUMENTS

| | | | |
|---|---|---|---|
| CN | 103914571 A | | 7/2014 |
| CN | 104239299 A | | 12/2014 |
| CN | 101944239 | * | 3/2016 |
| CN | 106021330 A | | 10/2016 |
| JP | 2011018328 A | * | 1/2011 |

OTHER PUBLICATIONS

International Search Report issued in corresponding International application No. PCT/CN2017/077495, dated Nov. 29, 2017.
Written Opinion of the International Searching Authority For No. PCT/CN2017/077495.

* cited by examiner

THREE-DIMENSIONAL SHAPE EXPRESSION METHOD AND DEVICE THEREOF

TECHNICAL FIELD

The present disclosure relates to a graphics technology, and in particular to a three-dimensional shape expression method and device thereof.

BACKGROUND

The gradual improvement of three-dimensional shape of a geometric information acquisition device and maturity of the three-dimensional modeling method have greatly improved the number of three-dimensional shape, which also puts forward higher requirements for the retrieval and comparison of the three-dimensional shape. Based on such observations, how to efficiently express the three-dimensional shape is the key of solving problems.

In recent years, correlative research achievements of expressions for the three-dimensional shape and correlative research achievements of using different three-dimensional shape expressions to perform shape retrieval have continuously increased. In the prior art, the expressions of the three-dimensional shape generally adopts a global or a local feature mode to describe the three-dimensional shape by using different feature descriptors. For example, volumes, areas, Fourier transform coefficients and other statistical data of the three-dimensional shape are adopted as global features to describe the three-dimensional shape. Or different three-dimensional shape are expressed basing on distributions of distance, angle, area and volume among random surface points in the three-dimensional shape and so on.

In summary, in the prior art, expression modes for the three-dimensional shape are mainly divided into three categories: (1) a feature-based expression; (2) a graph-based expression; (3) a perspective-based expression. And the feature-based expression only simply considers geometrical properties of surfaces of the three-dimensional shape and do not consider an integral structure of the three-dimensional shape. Intuitive feelings of people for the shape come from the structures, not details. And a graph-based expression mode only expresses a three-dimensional shape by connecting the graphs. If a further comparison or retrieval wants to be applied using the graph-based mode, additional definitions and calculation are required. And for the perspective-based expression mode, a core idea is that each perspective of the three-dimensional shape is captured by using a plurality of two-dimensional images, however, in order to capture information of the three-dimensional shape as completely as possible, a large number of two-dimensional images are required. If the number of the two-dimensional images is too small, a loss of many details on the shape is caused, so that a shape expression result is influenced. Moreover, while the two-dimensional images are obtained, specific descriptors are necessary to be calculated for the two-dimensional images, the images are impossible to be simply applied to various applications of the three-dimensional shape directly.

Therefore, the conventional expression modes for the three-dimensional shape all have certain problems and there is room for improvement.

SUMMARY

The embodiments of the present disclosure provide a three-dimensional shape expression mode and three-dimensional shape expression device, expressing a three-dimensional shape with an easy and high-efficient mode.

The embodiments of the present disclosure provide a three-dimensional shape expression method including steps: extracting a hybrid type framework of the three-dimensional shape; obtaining a segmentation of the three-dimensional shape by segmenting the hybrid type framework; obtaining a sub-structure of the three-dimensional shape according to the segmentation of the three-dimensional shape; and establishing an expression of the three-dimensional shape by using a bag-of-words model according to the sub-structure of the three-dimensional shape.

The step of extracting the hybrid type framework of the three-dimensional shape includes steps: obtaining sampling points by sampling surfaces of the three-dimensional shape; and re-expressing the sampling points to obtain the hybrid type framework including a one-dimensional curve and a two-dimensional slice.

The step of obtaining the segmentation of the three-dimensional shape by segmenting the hybrid type framework includes steps: segmenting the hybrid type framework; and obtaining the segmentation of the three-dimensional shape by segmenting the hybrid type framework, according to corresponding relationships between the hybrid type framework and the sampling points.

The step of obtaining the sub-structure of the three-dimensional shape according to the segmentation of the three-dimensional shape includes steps: obtaining a plurality of components of the three-dimensional shape by the segmentation of the three-dimensional shape; establishing a connecting graph connected with the plurality of components; and extracting a sub-graph of the connecting graph as the sub-structure of the three-dimensional shape.

The step of establishing the expression of the three-dimensional shape by using the bag-of-words model according to the sub-structure of the three-dimensional shape includes steps: matching the sub-structure of the three-dimensional shape with each candidate sub-structure in a candidate sub-structure set to determine a frequency of each candidate sub-structure appearing in the three-dimensional shape; establishing term vectors of the three-dimensional shape according to the frequency of each candidate sub-structure appearing in the three-dimensional shape; and normalizing the term vectors to obtain a bag-of-words expression of the three-dimensional shape.

Before the step of establishing the expression of the three-dimensional shape by using the bag-of-words model, the method further includes step: establishing the candidate sub-structure set, wherein the step of establishing the candidate sub-structure set includes: obtaining all the sub-structures of the three-dimensional shape in an input data set; determining similarities among the obtained sub-structures of the three-dimensional shape; and selecting the candidate sub-structure of the three-dimensional shape from the obtained sub-structures of the three-dimensional shape to form the candidate sub-structure set according to the similarities among the obtained sub-structures of the three-dimensional shape.

The step of determining the similarities among the obtained sub-structures of the three-dimensional shape includes steps: defining a graph kernel among the obtained sub-structures of the three-dimensional shape; and determining the similarities among the obtained sub-structures of the three-dimensional shape according to the graph kernel.

The step of defining the graph kernel among the obtained sub-structures of the three-dimensional shape includes step: defining a node kernel and an edge kernel; the node kernel is: $k_{node}(n_i, n_j)=1-D(h_i, h_j)/D_h^{max}$; the edge kernel is: $k_{edge}(e_i, e_j)=1-D(u_i, u_j)/D_u^{max}$; $k_{node}(n_i, n_j)$ represents the node kernel, $k_{edge}(e_i, e_j)$ represents the edge kernel, $n_i$, $n_j$ represent the nodes, $h_i$ and $h_j$ are respectively formed by a connection of a geometric feature histogram of components of the node $n_i$ and the node $n_j$, D is a normalized correlation of $h_i$ and $h_j$, $D_h^{max}$ is the largest value of a distance $D(h_i, h_j)$ of any two pairs $h_i$ and $h_j$, $u_i$ and $u_j$ are two-dimensional histograms formed by all points in two connecting components with respect to a vertical upward angle and the distance.

The embodiments of the present disclosure provide a three-dimensional expression device including: a framework extracting module configured to extract a hybrid type framework of the three-dimensional shape; a segmentation module configured to obtain the segmentation of the three-dimensional shape by segmenting the hybrid type framework; a sub-structure extracting module configured to obtain the sub-structure of the three-dimensional shape according to the segmentation of the three-dimensional shape; and an expression module configured to establish the expression of the three-dimensional shape by using the bag-of-words model according to the sub-structure of the three-dimensional shape.

The framework extracting module is specifically configured to obtain sampling points by sampling surfaces of the three-dimensional shape, and re-express the sampling points to obtain the hybrid type framework including a one-dimensional curve and a two-dimensional slice.

The segmentation module is specifically configured to segment the hybrid type framework, and obtain the segmentation of the three-dimensional shape by segmenting the hybrid type framework according to corresponding relationships between the hybrid type framework and the sampling points.

The beneficial effects of the present disclosure are as follows:

The embodiments of the present disclosure, for the three-dimensional shape, the bag-of-words expression mode based on the sub-structure is established, and this expression mode has features like simplicity, high efficiency and so on.

DETAILED DESCRIPTION

In order to make technical problems, technical schemes and beneficial effects solved by the present disclosure clearer, the present disclosure is further described below in detail with reference to the accompanying drawings and embodiments. It should be understood that the specific embodiments described herein are only used to explain the present disclosure and are not intended to limit the present disclosure.

Figure 1:
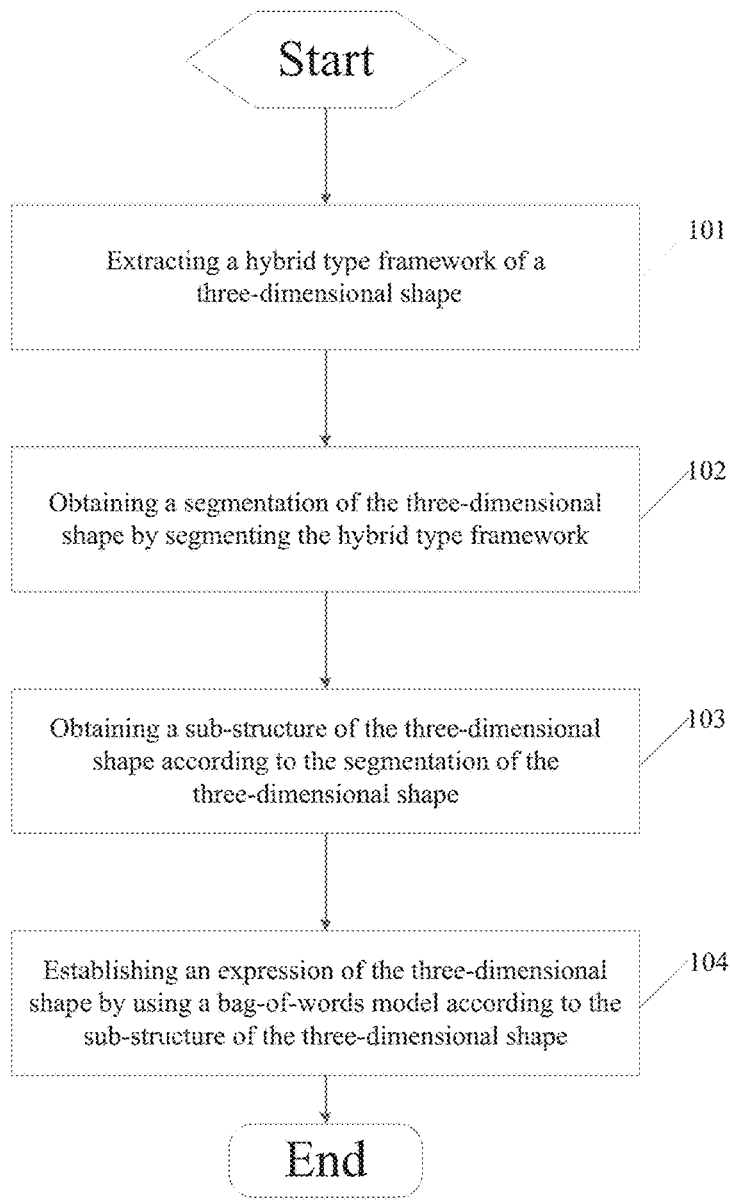
FIG. 1 is a flowschematic diagram of one embodiment of a three-dimensional shape expression method of the present disclosure.

FIG. 1 is a flowschematic diagram of one embodiment of a three-dimensional shape expression method of the present disclosure, the method includes following steps:

step 101: extracting a hybrid type framework of a three-dimensional shape;

step 102: obtaining a segmentation of the three-dimensional shape by segmenting the hybrid type framework;

step 103: obtaining a sub-structure of the three-dimensional shape according to the segmentation of the three-dimensional shape; and step 104: establishing an expression of the three-dimensional shape by using a bag-of-words model according to the sub-structure of the three-dimensional shape.

Figure 2:
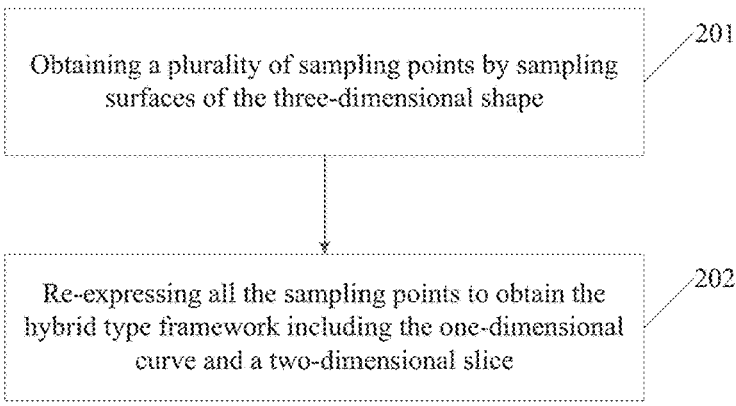
FIG. 2 is a flowschematic diagram of one embodiment of step 101 shown in FIG. 1.
Figure 6:
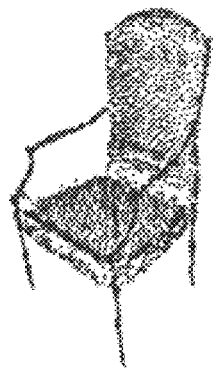
FIG. 6 is a schematic diagram of a hybrid type framework of a three-dimensional shape.

The hybrid type framework in step 101 includes: a one-dimensional curve and a two-dimensional slice. And FIG. 2 is a flow schematic diagram of one embodiment of step 101. Specifically, in order to extract the hybrid type framework, firstly, obtaining a plurality of sampling points by sampling surfaces of the three-dimensional shape, that is, step 201; secondly, re-expressing all the sampling points to obtain the hybrid type framework including the one-dimensional curve and the two-dimensional slice, that is, step 202. In step 201, the surfaces of the three-dimensional shape are performed to be sampled by using a poison disk sampling mode, and the sampling points are set to be about twenty thousand. The sampling points obtained in step 201 are surface points, while the sampling points in step 202 are extended to depth points, each surface point is combined with the corresponding framework point inside the three-dimensional shape, a direction of a connecting line of the depth points is made to be consistent with a normal vector of the surface points by optimizing an arrangement of the points on a shape surface and a framework, finally, a convergence of a function is optimized to obtain the hybrid type framework consisting of the one-dimensional curve and the two-dimensional slice. For example, FIG. 6 is the schematic diagram of the hybrid type framework of the three-dimensional shape of a chair.

Figure 3:
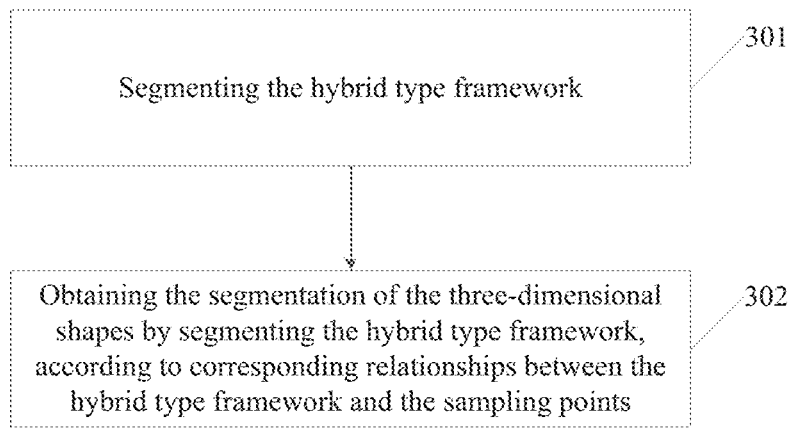
FIG. 3 is a flowschematic diagram of one embodiment of step 102 shown in FIG. 1.

FIG. 3 is a flow schematic diagram of one embodiment of step 102. Specifically, firstly, segmenting the hybrid type framework, that is, step 301; secondly, obtaining the segmentation of the three-dimensional shape by segmenting the hybrid type framework, according to corresponding relationships between the hybrid type framework and the sampling points, that is, step 302. In step 301, for each hybrid type framework point in the hybrid type framework, three local features based on PCA (Principal Component Analysis) are calculated. Selecting a geodesic neighborhood of the point and calculating a feature value $\lambda_1 \geq \lambda_2 \geq \lambda_3 \geq 0$ thereof are required for calculating the three features of each point, and defining:

$$L = \frac{\lambda_1 - \lambda_2}{\lambda_1 + \lambda_2 + \lambda_3}; P = \frac{2(\lambda_2 - \lambda_3)}{\lambda_1 + \lambda_2 + \lambda_3}; S = \frac{3\lambda_3}{\lambda_1 + \lambda_2 + \lambda_3};$$

Figure 7A:
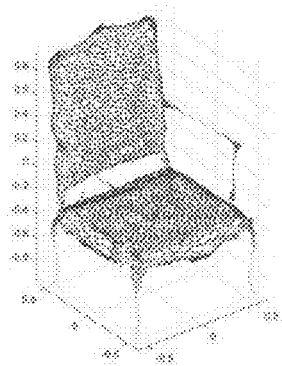
FIG. 7(a)-(c) are respectively three local feature schematic diagrams configured to segment a hybrid framework.
Figure 7B:
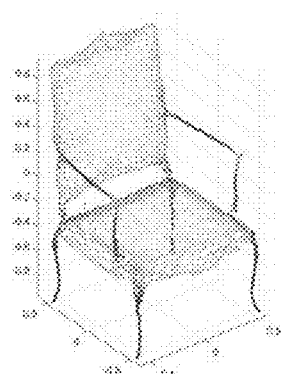
Figure 7C:
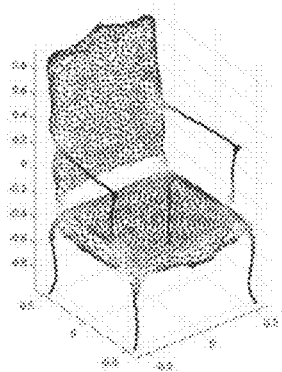

L, P, and S are the three local features and respectively describe a degree of a linear, a planarity and a spherical property of a neighborhood shape of the point. For example, as shown in FIG. 7(a)-(c), there are three schematic diagrams respectively for the three local features, that is, FIG. 7(a)-(c) respectively show the linear, the planarity and the spherical property of areas by a visual mode. The local features are used for a clustering process of segmenting the hybrid type framework. And in one embodiment of the present disclosure, a semi-supervised spectral clustering mode is adopted in order to obtain the segmentation of the three-dimension shape with more semantics, and the segmentation of the hybrid type framework is obtained by combining with a manual interaction of the hybrid type framework. Disposing two constrains of "connecting" and "incapable of connecting" on different points on the hybrid type framework is allowed to guide a result of the segmentation in a process of the manual interaction.

Figure 4:
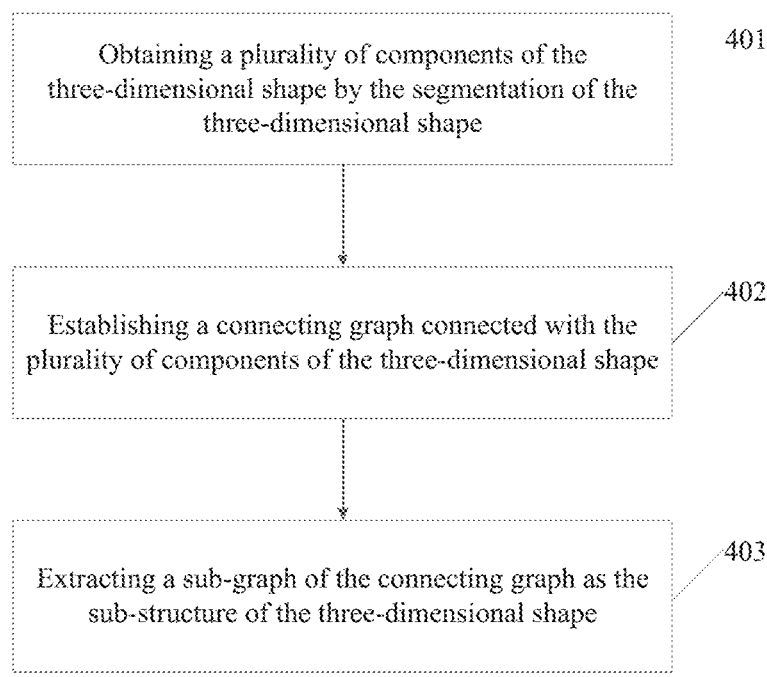
FIG. 4 is a flowschematic diagram of one embodiment of step 103 shown in FIG. 1.
Figure 8:
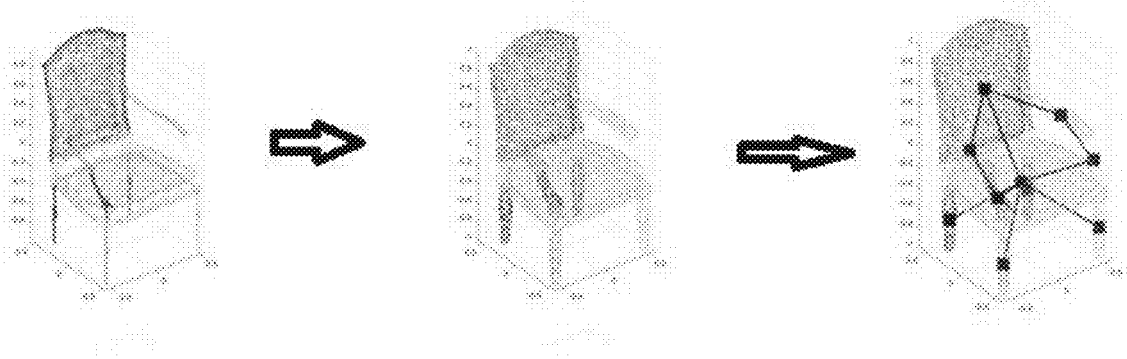
FIG. 8 is a flowschematic diagram of establishing a three-dimensional shape graph structure.

FIG. 4 is a flow schematic diagram of one embodiment of step 103. Specifically, firstly, obtaining a plurality of components of the three-dimensional shape by the segmentation of the three-dimensional shape, that is, step 401; secondly, establishing a connecting graph connected with the plurality of components of the three-dimensional shape, that is, step 402; finally, extracting a sub-graph of the connecting graph as the sub-structure of the three-dimensional shape, that is, step 403. A node of the connecting graph obtained in step 402 is the component of the three-dimensional shape, and when a connecting graph is established, if a distance between any pair of points in any two components is smaller than 2% of a diagonal length of a whole three-dimensional shape bounding box, the two components are connected through one edge. In step 403, the sub-graph with the number of connecting nodes as n=1, . . . , 5 in the connecting graph is extracted, so that the sub-structure corresponding to the three-dimensional shape is obtained, the sub-structure corresponding to the three-dimensional shape is represented by a series of geometrical features, and a value of n is not limited to the above example. FIG. 8 shows a process of establishing a three-dimensional shape graph structure, a shape in a left side of FIG. 8 is a segmentation schematic diagram of the hybrid type framework obtained after the manual interaction. A shape in a middle of FIG. 8 is the segmentation of the three-dimensional shape obtained through the connection of the hybrid type framework and shape surface points. A shape in a right side of FIG. 8 is an establishing connection diagram for each component connected with the three-dimensional shape.

Figure 5:
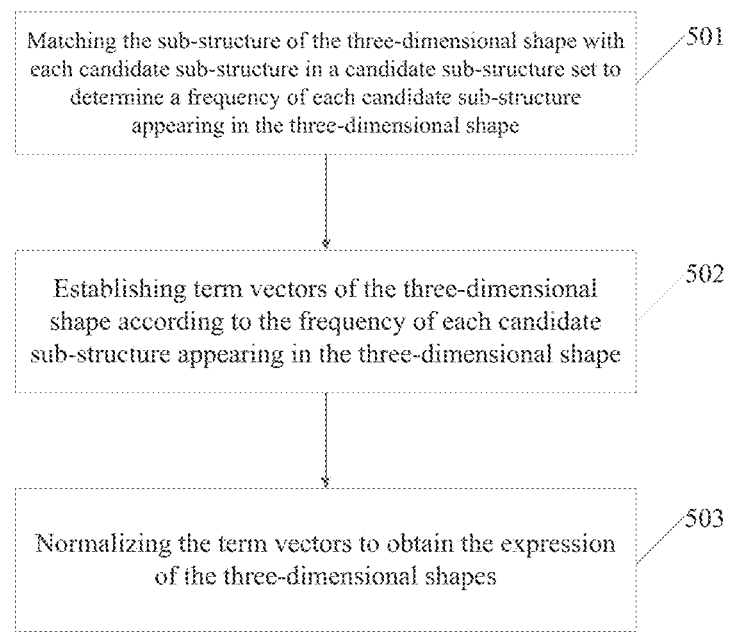
FIG. 5 is a flowschematic diagram of one embodiment of step 104 shown in FIG. 1.

FIG. 5 is a flow schematic diagram of one embodiment of step 104. Specially, firstly, matching the sub-structure of the three-dimensional shape with each candidate sub-structure in a candidate sub-structure set to determine a frequency of each candidate sub-structure appearing in the three-dimensional shape, that is, step 501; secondly, establishing term vectors of the three-dimensional shape according to the frequency of each candidate sub-structure appearing in the three-dimensional shape, that is, step 502; finally, normalizing the term vectors to obtain the expression of the three-dimensional shape, that is, step 503.

The candidate sub-structure set in step 501 is pre-established, for example, establishing candidate sub-structure set by using information of all the three-dimensional shapes in an input data set. Specially, the sub-structures of all the three-dimensional shapes in the input data set are made to be obtained, and obtaining modes herein include: firstly, respectively extracting and segmenting the hybrid type framework of each three-dimensional shape to obtain the segmentation of the three-dimensional shape, and then the sub-structures of the three-dimensional shape are obtained; secondly, determining similarities among the obtained sub-structures of the three-dimensional shape; finally, selecting the candidate sub-structure from the obtained sub-structures of the three-dimensional shape to form the candidate sub-structure set according to the similarities among the obtained sub-structures of the three-dimensional shape. In addition, when the candidate sub-structures are selected, the number of the candidate sub-structures is determined at the same time.

A distance between two sub-structures of the three-dimensional shape is used in order to select the sub-structure of the three-dimensional shape with representative. The distance between two sub-structures of the three-dimensional shape with the same number of components is calculated by the step of calculating similarities of two sub-graphs with the same number of nodes and then the similarities among the sub-structures of the three-dimensional shape is obtained. A node kernel and an edge kernel are used in a calculating process, in one embodiment, the node kernel is defined as:

$$k_{node}(n_i, n_j) = 1 - D(h_i, h_j)/D_h^{max},$$

$h_i$ and $h_j$ are respectively formed by a connection of geometric feature histograms of components of the node $n_i$ and the node $n_j$, geometric features include a shape diameter function and the three local features based on PCA, and a dimension of each feature histogram is sixteen. D is a normalized correlation of $h_i$ and $h_j$. $D_h^{max}$ is the largest value of a distance $D(h_i, h_j)$ of any two pairs $h_i$ and $h_j$.

The edge kernel is configured to capture the similarities of two connecting components, and the edge kernel is defined as:

$$k_{edge}(e_i, e_j) = 1 - D(u_i, u_j)/D_u^{max},$$

$u_i$ and $u_j$ are two-dimensional histograms formed by all points in two connecting components with respect to a vertical upward angle and the distance. The two features are obtained by calculating a distance of line segments formed by point pairs and an included angle formed by the line segments and a three-dimensional shape vertical upward direction. The similarities of the two sub-structures of the three-dimensional shape is obtained by a summing of the similarities which graph walks are less than or equal to p in the graph kernel, p is the number of sub-structure nodes. That is, the similarities of two sub-structures of the three-dimensional shape is calculated by a considering node kernel and a graph walk kernel of the edge kernel.

After defining the similarities of the sub-structures, the candidate sub-structure set C is extracted from all initial sub-structures (that is, the sub-structures of all the three-dimensional shape descried above) to establish a dictionary in the bag-of-words model. For an initial sub-structure set, one problem of existing a large number of similar sub-structures is required to be solved. A main reason for generating the problem is that a distinguishing property of three-dimensional shape sub-structure is not large. Thus, in order to avoid processing the large number of similar or unrelated sub-structures, the candidate sub-structure set is obtained by performing a density analysis of a sub-structure similarities space in the present disclosure. That is, a density of all the sub-structures is calculated, and then only the sub-structures with the density at a peak value are retained. The peak value of the density is associated with a clustering center of the initial sub-structure set with the same number of nodes. So only the sub-structure surrounded by the similar sub-structures in a similar space is selected, redundant similar sub-structures is prevented from processing. The sub-structure above which density is also at the peak value. At the same time, due to a fact that the sub-structures are density peak values, the sub-structures frequently appear in the sub-structure set.

A method of clustering is adopted in order to calculate the density with a relatively robust mode. Before clustering, the clustering center is assumed to be surrounded by the sub-structure nearby with a lower density value and keeps a relatively long distance from other sub-structures with higher density values. Specifically, firstly, calculating the distance of two sub-structures by a definition of the similarities between the graph kernel and the sub-structures and noting the distance of two sub-structures as $d_{ij}$. Secondly, defining a local density $\rho_i$ of one certain sub-structure $e_i$ as:

$$\rho_i = \Sigma_j \chi(d_{ij} - d_c),$$

when x<1, $\chi(x)=1$, otherwise the value is zero; $d_c$ is a cutoff distance, $d_c$ herein is disposed as a 2nd percentage value after sequencing a distance value among all the sub-structures from small to large. Thirdly, defining a distance $\delta_i$ from one sub-structure to other sub-structures with higher density as:

$$\delta_i = \min_{j: \rho_j > \rho_i} d_{ij},$$

and the sub-structure with the highest density is set as a special example, a distance from the sub-structure with the highest density to other sub-structures with high density is defined as $\delta_i = \max_j d_{ij}$. Finally, sequencing all the sub-structures according to $\delta_i$, and selecting the largest front K sub-structures to obtain the largest distance value $\delta_i$. The number K of the sub-structures is set according to experiences, such as determining the number K of the sub-structures according to a variance $\gamma_i = \rho_i \delta_i$. The candidate sub-structure set C is finally obtained according the above mode. It is noted that the above method is respectively processed according to the sub-structures containing different number of the components.

After obtaining the candidate sub-structure set C according to a concept of the bag-of-words model, a vector t represents the frequency of the candidate sub-structure set C appearing in each three-dimensional shape, which is called the term vectors of the three-dimensional shape. t is an m-dimensional vector, wherein m is the number of the sub-structures in the candidate sub-structure set C. Each dimension of t counts the number of times that a candidate sub-structure appears on the three-dimensional shape, and then a normalized processing is performed by using the number of all the sub-structures in the three-dimensional shape. If one certain related sub-structure does not appear on the three-dimensional shape, a corresponding dimensional value is zero.

In order to establish the term vectors for the given three-dimensional shape S, a process which is similar to the process of obtaining the initial sub-structure is adopted and obtained to extract the sub-structure from the three-dimensional shape. Then, only the sub-structures related to the candidate sub-structure set C are retained, and detected sub-structures are counted to set the values corresponding to the related sub-structures in the term vectors. The similarities among the sub-structures are required to be considered to find the sub-structure similar to the candidate to sub-structure set C in the three-dimensional shape S. For sub-structures shown in figures, one sub-structure s∈S in the three-dimensional shape and one candidate sub-structure c∈C are given, if a kernel distance between the sub-structure s and the sub-structure C is less than a threshold value $\tau_s$, the two sub-structures are considered to be similar. In order to obtain the threshold value of each candidate sub-structure C, the kernel distances between the sub-structure C and other sub-structures are required to be calculated firstly, and a histogram is established to be obtained. Then, the histogram is fitted into a Beta distribution, and a $\tau_s$ value is set to be a position where an inverse cumulative distribution function value is 0.05, which means that 95% of the distance from other sub-structures to the sub-structure care greater than $\tau_s$.

Figure 9:
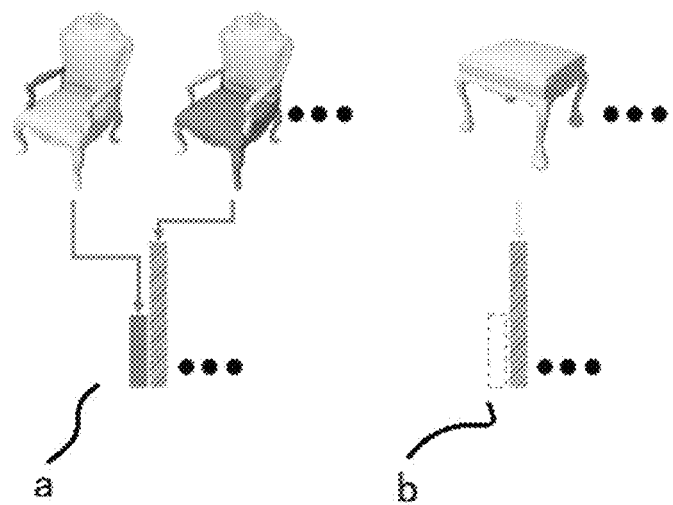
FIG. 9 is a schematic diagram of a bag-of-words expression of the three-dimensional shape.

FIG. 9 shows a three-dimensional chair shape and a three-dimensional stool shape, a and b respectively represent a bag-of-words expression of the two three-dimensional shapes, that is, the term vectors, and the term vector t of each three-dimensional shape is represented by an m-dimensional histogram. The same positions of the histograms correspond to one common candidate sub-structure. In FIG. 9, the two three-dimensional shapes are observed to have a common "a seat cushion and a supporting leg" sub-structure. And for the shape of a stool, a shape type of the stool is different from the shape type of a chair, the stool does not have "an armrest" sub-structure of the chair, thus, corresponding data does not exist in a corresponding dimension of the histogram.

In the prior art, when the three-dimensional shape is expressed, a requirement for data input is high; according to one embodiment of the present disclosure, an adaptability for an input three-dimensional shape is high. At the same time, the three-dimensional shape expression of the present disclosure is based on the expression of the sub-structure, so that a global frame of the three-dimensional shape is easier to capture, moreover, the three-dimensional shape expression thereof is more capable to adapt with a three-dimensional shape data with noise and missing problems. In addition, the three-dimensional expression in the prior art use two-dimensional images, but a plurality of angles are required to completely capture a morphology of the three-dimensional shape, so that a large number of the two-dimensional images are used; the bag-of-words expression of the present disclosure is just a simple histogram, a structure of the three-dimensional shape is well reflected, and an application extension is more convenient. In addition, in the present disclosure, when a final expression result of the three-dimensional shape is applied to comparison or retrieval, a distance calculation is directly performed without further processing and conversion on the basis.

The principles of the embodiments of the present disclosure are described above, and the application descriptions of the embodiments of the present disclosure are described as examples below.

Figure 10:
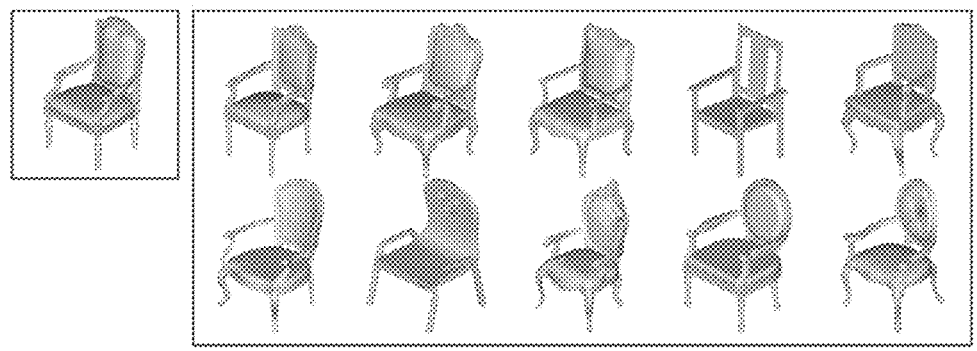
FIG. 10 is a schematic diagram of a three-dimensional shape retrieval.

The three-dimensional shape expression mode of one embodiment of the present disclosure can be applied to the fields of three-dimensional shape retrieval, comparison, classification and identification and even more. The application of one embodiment of the present disclosure is described below with retrieval as an example. For a given three-dimensional shape with a new input, the "initial sub-structure" of the three-dimensional shape is segmented and extracted, then the candidate sub-structures are matched according to the similarities of the sub-structures, appearing frequencies of all the candidate sub-structures is obtained, so that the process of expressing the three-dimensional shape by using the bag-of-words model is completed. Then, the distance value between the expression of the three-dimensional shape with the new input and each three-dimensional expression in a data set is calculated, and a retrieval result is obtained according to the calculated distance value, for example, the smaller the distance value between the expression of the three-dimensional shape with the new input and each three-dimensional expression in a data set is, the more similar the two three-dimensional shapes are. For example, FIG. 10 is a result diagram of a three-dimensional shape retrieval application, a three-dimensional shape input of a retrieval process is shown in a left square block of FIG. 10, and results returned by the retrieval is shown in the right square block of FIG. 10. In FIG. 10, front ten corresponding three-dimensional shapes with the minimum distance are taken as returned retrieval results, and from the results, appearance structures of the front ten corresponding three-dimensional shapes are most similar to appearance structures of the retrieval three-dimensional shape.

The method embodiments of the present disclosure are described above and the device embodiments of the present disclosure are described below.

Figure 11:
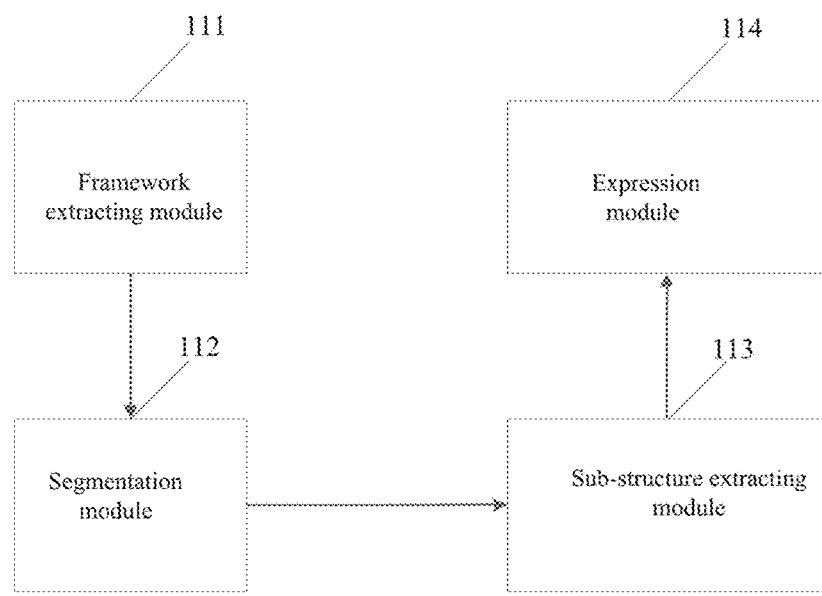
FIG. 11 is a structural schematic diagram of one embodiment of a three-dimensional expression device of the present disclosure.

FIG. 11 is a structural schematic diagram of one embodiment of a three-dimensional expression device of the present disclosure, the three-dimensional expression device including: a framework extracting module 111 configured to extract a hybrid type framework of a three-dimensional shape; a segmentation module 112 configured to obtain a segmentation of the three-dimensional shape by segmenting the hybrid type framework, a sub-structure extracting module 113 configured to obtain a sub-structure of the three-dimensional shape according to the segmentation of the three-dimensional shape; and an expression module 114 configured to establish an expression of the three-dimensional shape by using a bag-of-words model according to the sub-structure of the three-dimensional shape. The framework extracting module 111 is specifically configured to obtain the sampling points by sampling the surfaces of the three-dimensional shape, and re-express the sampling points to obtain the hybrid type framework including the one-dimensional curve and the two-dimensional slice. The segmentation module 112 is specifically configured to segment the hybrid type framework, and obtain the segmentation of the three-dimensional shape by segmenting the hybrid type framework, according to the corresponding relationships between the hybrid type framework and the sampling points.

It should be noted that functions and effects of each module in the device respectively correspond to the steps 101-104 of the method embodiments, the steps are described in details before, and therefore descriptions are not repeated for brevity.

Persons of ordinary skills in the art are capable to understand that achieving all or part of the processes in the method of the above embodiments are completed by a computer program instructing relevant hardwares, the computer program is stored in a computer readable storage medium, when the computer program is executed, processes of the embodiments of above methods are included. The storage medium is a magnetic disk, an optical disk, a read-only memory (ROM) or a random access memory (RAM) and so on.

The above descriptions are only preferred embodiments of the present disclosure, and are not intended to limit the present disclosure, any modification, equivalent replacement and improvement made within the spirit and principle of the present disclosure should be included within the protection scope of the present disclosure.

What is claimed is:

1. A three-dimensional shape expression method, comprising following steps:
    extracting a hybrid type framework of a three-dimensional shape;
    obtaining a segmentation of the three-dimensional shape by segmenting the hybrid type framework;
    obtaining a sub-structure of the three-dimensional shape according to the segmentation of the three-dimensional shape; and
    establishing an expression of the three-dimensional shape by using a bag-of-words model according to the sub-structure of the three-dimensional shape.

2. The three-dimensional shape expression method according to claim 1, wherein the step of extracting the hybrid type framework of the three-dimensional shape comprises:
    obtaining sampling points by sampling surfaces of the three-dimensional shape; and
    re-expressing the sampling points to obtain the hybrid type framework comprising a one-dimensional curve and a two-dimensional slice.

3. The three-dimensional shape expression method according to claim 2, wherein the step of obtaining the segmentation of the three-dimensional shape by segmenting the hybrid type framework comprises:
    segmenting the hybrid type framework; and
    obtaining the segmentation of the three-dimensional shape by segmenting the hybrid type framework, according to corresponding relationships between the hybrid type framework and the sampling points.

4. The three-dimensional shape expression method according to claim 1, wherein the step of obtaining the sub-structure of the three-dimensional shape according to the segmentation of the three-dimensional shape comprises:
    obtaining a plurality of components of the three-dimensional shape by the segmentation of the three-dimensional shape;
    establishing a connecting graph connected with the plurality of components of the three-dimensional shape; and
    extracting a sub-graph of the connecting graph as the sub-structure of the three-dimensional shape.

5. The three-dimensional shape expression method according to claim 1, wherein the step of establishing the expression of the three-dimensional shape by using the bag-of-words model according to the sub-structure of the three-dimensional shape comprises:
    matching the sub-structure of the three-dimensional shape with each candidate sub-structure in a candidate sub-structure set to determine a frequency of each candidate sub-structure appearing in the three-dimensional shape;
    establishing term vectors of the three-dimensional shape according to the frequency of each candidate sub-structure appearing in the three-dimensional shape; and
    normalizing the term vectors to obtain a bag-of-words expression of the three-dimensional shape.

6. The three-dimensional shape expression method according to claim 5, wherein before the step of establishing the expression of the three-dimensional shape by using the bag-of-words model, the method further comprises:
    establishing the candidate sub-structure set;
    wherein the step of establishing the candidate sub-structure set comprises:

obtaining all the sub-structures of the three-dimensional shape in an input data set;

determining similarities among the obtained sub-structures of the three-dimensional shape; and selecting the candidate sub-structure from the obtained sub-structures of the three-dimensional shape to form the candidate sub-structure set according to the similarities among the obtained sub-structures of the three-dimensional shape.

7. The three-dimensional shape expression method according to claim 6, wherein the step of determining the similarities among the obtained sub-structures of the three-dimensional shape comprises:

defining a graph kernel among the obtained sub-structures of the three-dimensional shape; and determining the similarities among the obtained sub-structures of the three-dimensional shape according to the graph kernel.

8. The three-dimensional shape expression method according to claim 7, wherein the step of defining the graph kernel among the obtained sub-structures of the three-dimensional shape comprises:

defining a node kernel and an edge kernel;

wherein the node kernel is: $k_{node}(n_i, n_j)=1-D(h_i, h_j)/D_h^{max}$;

the edge kernel is: $k_{edge}(e_i, e_j)=1-D(u_i, u_j)/D_u^{max}$;

$k_{node}(n_i, n_j)$ represents the node kernel, $k_{edge}(e_i, e_j)$ represents the edge kernel, $n_i$, $n_j$ represent the nodes, $h_i$ and $h_j$ are respectively formed by a connection of a geometric feature histogram of components of the node $n_i$ and the node $n_j$, D is a normalized correlation of $h_i$ and $h_j$, $D_h^{max}$ is the largest value of a distance $D(h_i, h_j)$ of any two pairs $h_i$ and $h_j$, $u_i$ and $u_j$ are two-dimensional histograms formed by all points in two connecting components with respect to a vertical upward angle and the distance.

9. A three-dimensional shape expression computer program product, stored in a non-transitory tangible computer-readable medium, comprising:

a framework extracting module configured to extract a hybrid type framework of a three-dimensional shape;

a segmentation module configured to obtain a segmentation of the three-dimensional shape by segmenting the hybrid type framework;

a sub-structure extracting module configured to obtain a sub-structure of the three-dimensional shape according to the segmentation of the three-dimensional shape; and an expression module configured to establish an expression of the three-dimensional shape by using a bag-of-words model according to the sub-structure of the three-dimensional shape.

10. The three-dimensional shape expression computer program product according to claim 9, wherein the framework extracting module samples surfaces of the three-dimensional shape to obtain sampling points and re-expresses the sampling points to obtain the hybrid type framework comprising a one-dimensional curve and a two-dimensional slice;

wherein segmentation module segments the hybrid type framework and obtains the segmentation of the three-dimensional shape by corresponding relationships between the hybrid type framework and the sampling points.

* * * * *